US006969220B2

(12) United States Patent
Anquetin

(10) Patent No.: US 6,969,220 B2
(45) Date of Patent: Nov. 29, 2005

(54) WALL ANCHOR FOR A SCREW, AND ASSEMBLY CONSTITUTED BY SUCH A WALL ANCHOR AND A SCREW

(75) Inventor: Robert Anquetin, Fontaine la Riviere (FR)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/824,508

(22) Filed: Apr. 14, 2004

(65) Prior Publication Data
US 2005/0013677 A1 Jan. 20, 2005

(30) Foreign Application Priority Data
Apr. 24, 2003 (FR) .................. 03 05032

(51) Int. Cl.$^7$ ............................................. F16B 13/04
(52) U.S. Cl. ...................................................... 411/38
(58) Field of Search ................ 411/38, 479, 29–31, 411/34, 61, 477, 478

(56) References Cited
U.S. PATENT DOCUMENTS

| 2,017,421 | A | * | 10/1935 | Post ............................ 411/38 |
| 2,171,985 | A | * | 9/1939 | Mushet ........................ 411/31 |
| 2,269,646 | A | * | 1/1942 | Burke ............................ 72/56 |
| 2,406,536 | A | * | 8/1946 | Gelpcke ...................... 411/31 |
| 2,559,281 | A | * | 7/1951 | Frederick ..................... 411/38 |
| 2,762,119 | A | * | 9/1956 | Jackson ....................... 72/336 |
| 2,762,252 | A | * | 9/1956 | Karitzky ..................... 411/38 |
| 3,123,370 | A | * | 3/1964 | Unander ...................... 411/31 |
| 3,143,915 | A | * | 8/1964 | Tendler ....................... 411/29 |
| 3,279,301 | A | * | 10/1966 | Fisher ...................... 29/522.1 |
| 3,298,645 | A | * | 1/1967 | Morris ......................... 248/71 |
| 3,316,796 | A | * | 5/1967 | Young .......................... 411/29 |
| 3,385,156 | A | * | 5/1968 | Polos ........................... 411/30 |
| 3,398,627 | A | * | 8/1968 | Tendler ....................... 411/29 |
| 3,437,004 | A | * | 4/1969 | Pacharis ...................... 411/29 |
| 3,765,296 | A | * | 10/1973 | Fischer ....................... 411/49 |
| 3,778,755 | A | * | 12/1973 | Marks ........................ 439/853 |
| 3,888,156 | A | * | 6/1975 | Fima ........................... 411/38 |
| 4,047,462 | A | * | 9/1977 | Hurtig ....................... 411/346 |
| 4,055,051 | A | * | 10/1977 | Finney .................... 405/259.6 |
| 4,123,640 | A | * | 10/1978 | Ballantyne ................ 200/296 |
| 4,157,677 | A | * | 6/1979 | Deutschenbaur et al. ... 411/548 |
| 4,223,587 | A | * | 9/1980 | Deutschenbaur ............ 411/31 |
| 4,285,264 | A | * | 8/1981 | Einhorn ..................... 411/345 |
| 4,293,258 | A | * | 10/1981 | McKewan ................... 411/30 |
| 4,353,673 | A | * | 10/1982 | Lesowsky ................... 411/38 |
| 4,402,637 | A | * | 9/1983 | Seghezzi et al. ............ 411/31 |
| 4,617,692 | A | * | 10/1986 | Bond et al. .................. 7/158 |

(Continued)

FOREIGN PATENT DOCUMENTS

EP  0 378 907 B1  8/1992

(Continued)

*Primary Examiner*—Robert J. Sandy
*Assistant Examiner*—Jeffrey A. Sharp
(74) *Attorney, Agent, or Firm*—Harness, Dickey & Pierce, P.L.C.

(57) ABSTRACT

A wall anchor (1) has a head shaft (5) and a screw nut shaft (6) on the same longitudinal axis (4), connected to each other by a plurality of approximately longitudinal small bars (7). The bars (7) are plastically flexible in a direction away from the axis (4). The screw nut shaft (6) is equipped with teeth (18) of generally triangular shape. The teeth (18) form a longitudinal projection with respect thereto and converge on the axis (4) to define a point (22) to perforate or drill a partition (8).

9 Claims, 4 Drawing Sheets

U.S. PATENT DOCUMENTS

| | | | |
|---|---|---|---|
| 4,696,423 A * | 9/1987 | Ryan | 227/55 |
| 4,702,654 A * | 10/1987 | Frischmann et al. | 411/31 |
| 4,826,358 A * | 5/1989 | Brustrom | 405/259.1 |
| 4,986,710 A * | 1/1991 | Kovarik | 411/38 |
| 4,990,042 A * | 2/1991 | Szayer et al. | 411/29 |
| 5,067,864 A * | 11/1991 | Dewey et al. | 411/344 |
| 5,147,166 A * | 9/1992 | Harker | 411/29 |
| 5,297,909 A * | 3/1994 | Tsay et al. | 411/29 |
| 5,308,203 A * | 5/1994 | McSherry et al. | 411/31 |
| 5,447,400 A * | 9/1995 | Seymour | 411/29 |
| 5,475,303 A * | 12/1995 | Kobayashi | 324/142 |
| 5,529,449 A * | 6/1996 | McSherry et al. | 411/31 |
| 5,536,121 A * | 7/1996 | McSherry | 411/31 |
| 5,544,980 A * | 8/1996 | Seegmiller | 405/259.6 |
| 5,692,864 A * | 12/1997 | Powell et al. | 411/30 |
| 5,725,341 A * | 3/1998 | Hofmeister | 411/32 |
| 5,749,687 A * | 5/1998 | Kilgore, III | 411/29 |
| 5,911,550 A * | 6/1999 | Popp et al. | 411/30 |
| RE36,622 E * | 3/2000 | Harker | |
| 6,602,034 B2 * | 8/2003 | Wakai et al. | 411/37 |
| 6,609,866 B2 * | 8/2003 | Huang et al. | 411/34 |
| 6,837,659 B2 * | 1/2005 | Oberkofler | 411/82.1 |

FOREIGN PATENT DOCUMENTS

FR          2 640 704          6/1990

* cited by examiner

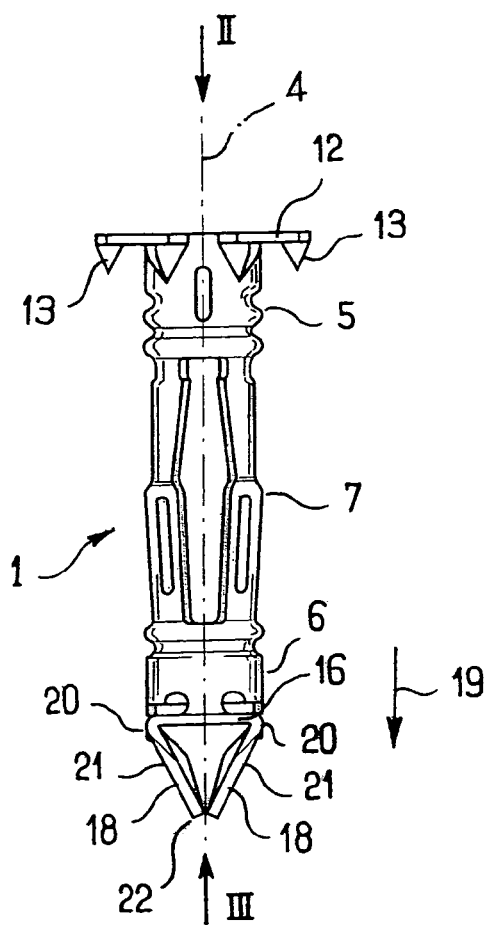
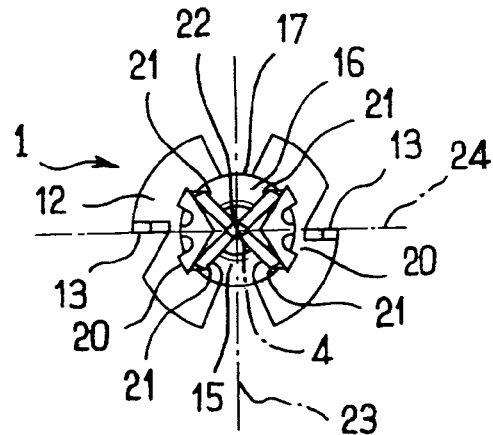
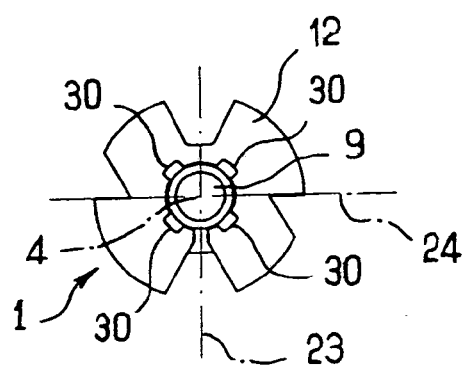
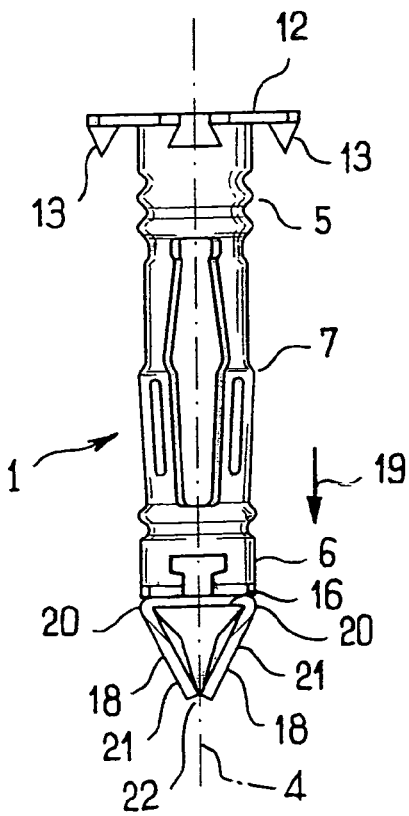
FIG_1
FIG_3
FIG_2
FIG_4

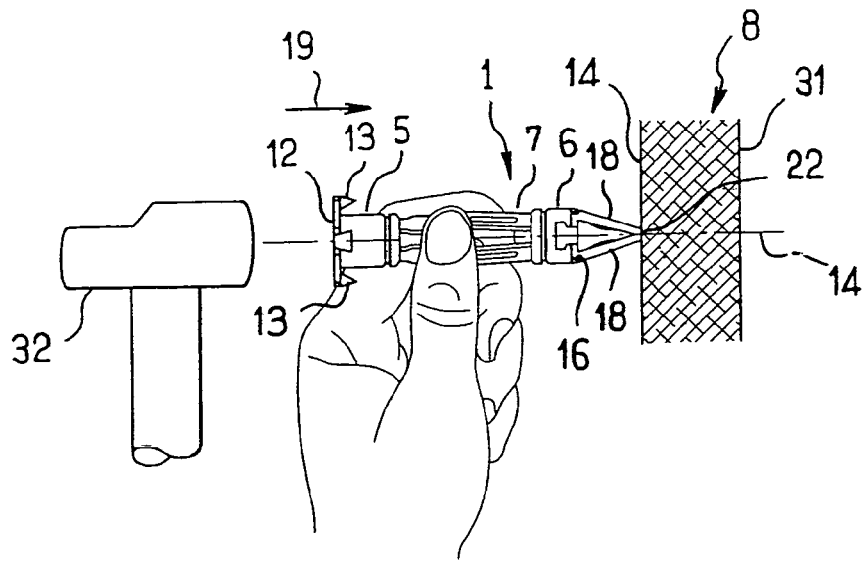
FIG_6
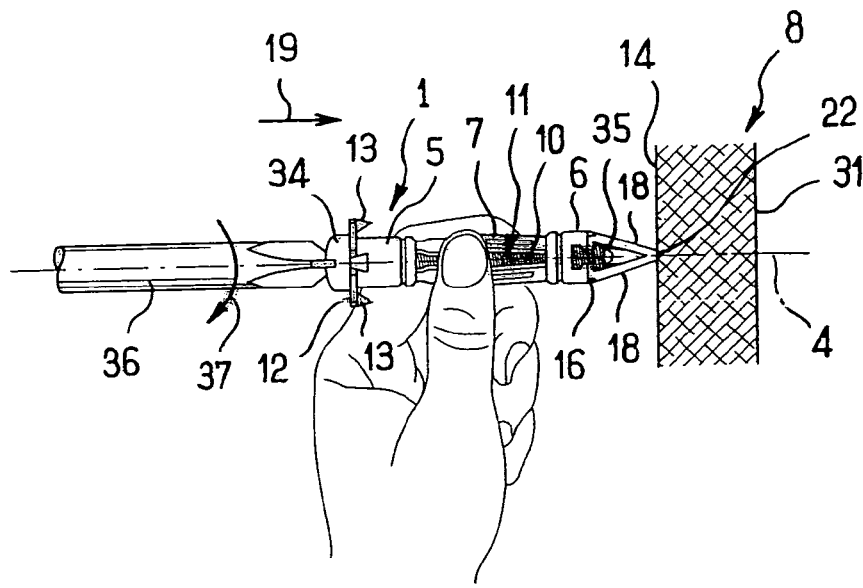
FIG_7
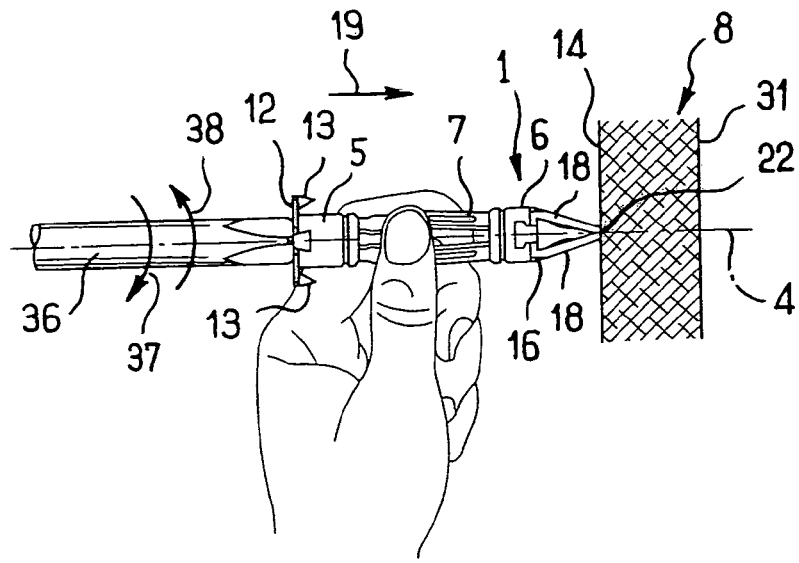
FIG_8

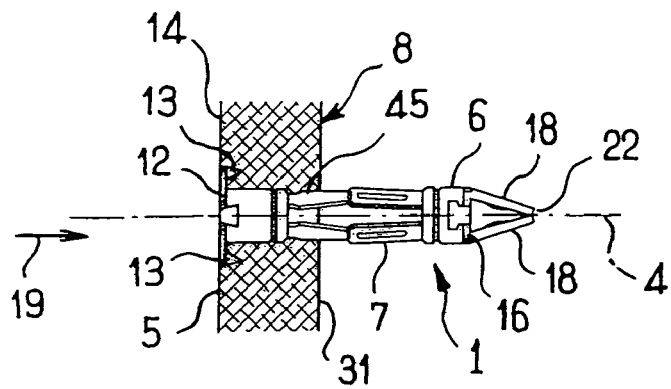
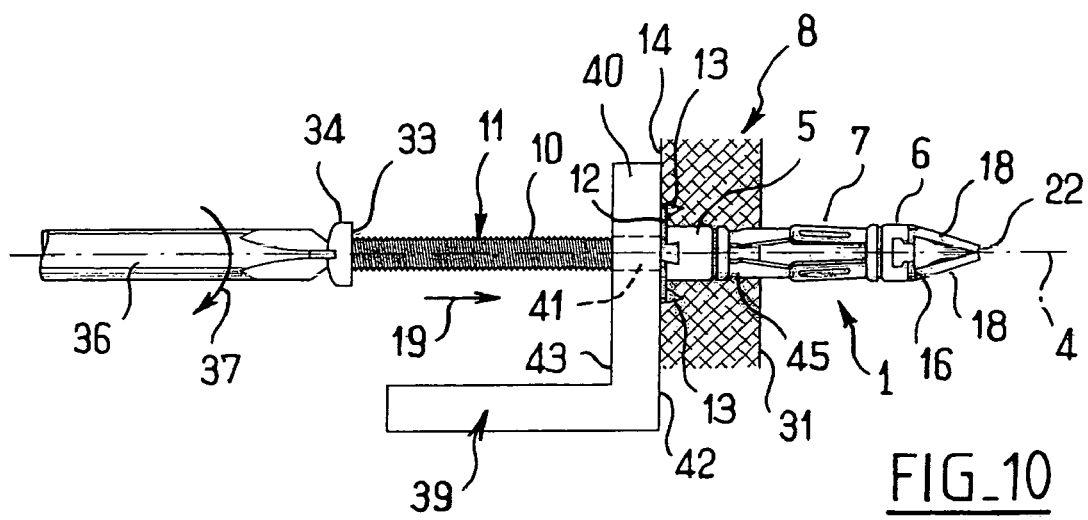
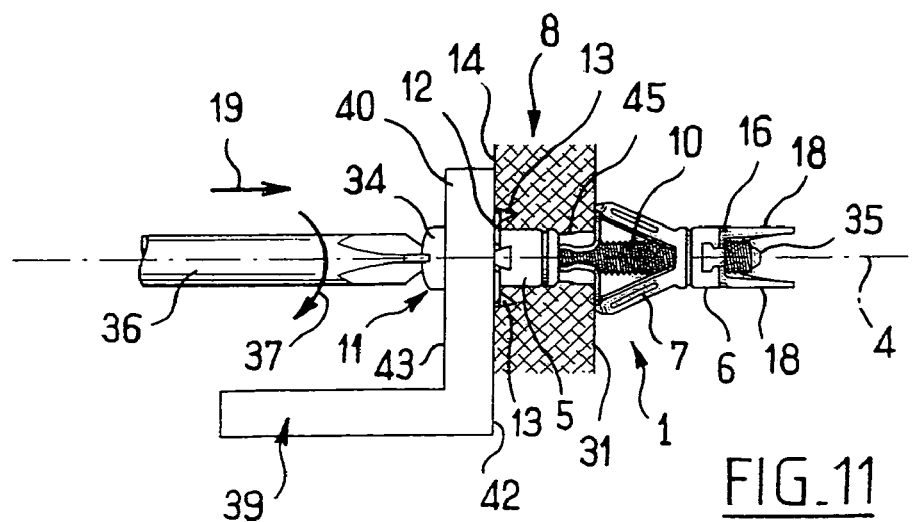

US 6,969,220 B2

WALL ANCHOR FOR A SCREW, AND ASSEMBLY CONSTITUTED BY SUCH A WALL ANCHOR AND A SCREW

CROSS-REFERENCE TO RELATED APPLICATIONS

This application claims priority to French Patent Application No. 0305032 filed Apr. 24, 2003, which application is herein expressly incorporated by reference.

FIELD OF THE INVENTION

The present invention relates to a wall anchor for a screw, of the type defining a longitudinal axis and includes teeth to enable insertion into a partition.

BACKGROUND OF THE INVENTION

A wall anchor constituted essentially by upsetting and bending a single metal strip, is described in FR-B 2 640 704 and in EP-B 0 378 907. An embodiment in which it is intended to be used, in the manner of a wood bit of the type known by the name "center bit", to drill a partition in which it is to be anchored. It is driven by rotation on itself about its axis with respect to the partition. For example a screwdriver, acting on a head of the screw, the screw rod of which is screwed into the screw nut shaft and the head is positioned so as to bear longitudinally on the collar of the head shaft of the wall anchor.

The teeth of known wall anchor are oriented parallel to its axis and have a respective cutting inclined edge. The screw rod of the screw is extended, longitudinally opposite to the screw head, by an axial point which forms, with respect to the screw nut shaft, a projection greater than that of the teeth in order to engage in the partition before the latter. This ensures fixing of the common axis of the wall anchor and of the screw when the teeth come into contact with the partition. The teeth progressively penetrate into the partition under the action of the rotation imparted to the wall anchor about the axis.

Such guiding, ensures fixing of the axis of the wall anchor and of the screw with respect to the partition during drilling of the latter by the teeth of the screw nut shaft. The presence of the point which extends the screw rod of the screw beyond the anchor constitutes a drawback in so far as it is necessary. In order to accommodate this point, to dispose it within or at the back of the partition, a much larger clearance is necessary in the direction of the common axis of the wall anchor and the screw. This is larger than the clearance necessary to accommodate the screw rod, devoid of such a point in the case when standard screws are used in association with the more conventional wall anchors. Standard screws are devoid of drilling teeth and are anchored in a hole previously made in the partition by a conventional drill bit, independent of the wall anchor.

Another drawback of the necessary presence of the guide point in the extension of the screw rod of the screw lies in the impossibility of using a wall anchor produced according to the teachings of FR-B 2 640 704 and EP-B 0 378 907 in association with standard screws. The screw rod is devoid of any guide point if it is desired to benefit from the possibility of drilling the partition by the wall anchor itself. The use of the known wall anchor requires, in effect, the manufacture and holding in stock, specifically adapted screws equipped with the guide point. This creates constraints and additional manufacturing and storage costs. Also, screws which are specifically adapted require more material and are bulkier than the standard screws with identical dimensions of the actual screw rod.

SUMMARY OF THE INVENTION

The aim of the present invention is to remedy these drawbacks and, to this end, the present invention proposes a wall anchor of the type indicated, where each tooth converges towards the axis in a longitudinal direction going from the head shaft. Each tooth has a generally triangular shape defined by a side connected to the screw nut shaft and by two free sides. The teeth together define a point symmetrical with respect to the axis projecting longitudinally on the screw nut shaft in the longitudinal direction. The teeth of the screw nut shaft themselves constitute a centring point capable of ensuring the fixing of the axis of the wall anchor with respect to a partition, in which it is wished to set it, whether the wall anchor is associated with a screw or not.

A wall anchor according to the invention makes it possible to use standard screws. Screws that are devoid of a guide point in the extension of their screw rod. Accordingly, it is not necessary to manufacture and keep in stock specifically adapted screws. Likewise, it is not necessary to dispose within or at the back of the partition as much space as when it is necessary to accommodate the guide point of the screw necessarily used in association with such a previously known wall anchor.

Moreover, due to the point defined by the teeth of the head shaft, a wall anchor according to the invention may be used to perforate the partition even without relative rotation. Simply, by applying a longitudinal thrust to the head of the shaft after the point of the screw nut shaft has been placed in contact with the partition. This may be done for example with a hammer. The wall anchor according to the invention then behaves with regard to the partition like a simple nail as it penetrates into the partition.

However, with a view to setting a wall anchor according to the invention in a partition where the material of which it is made does not lend itself to such a method of perforation, or in order to render more accurate and more reproducible geometry of the hole made by the wall anchor itself in the partition, an embodiment of the wall anchor according to the invention is preferred which allows it to be used not only like a nail but also like a drill bit. Accordingly, the anchor progressively drills its receiving hole in the partition by rotation about its axis after its point has been placed against the partition.

To this end, according to a preferred embodiment of a wall anchor according to the invention, at least one of the free sides of each tooth, turned in a specific circumferential direction, is in the shape of a cutting edge. This makes it possible to drill the receiving hole for the wall anchor by rotation of the latter about its axis in the aforesaid circumferential direction.

According to an even more preferred embodiment, the two free sides of each tooth are in the respective shape of a cutting edge. This makes it possible to carry out drilling by rotation of the wall anchor in one direction or the other.

The head shaft has an indentation to enable the appropriate rotational movement to be imparted to the wall anchor. A screwdriver is inserted into the indentation and rotated thereby making it possible to carry out drilling without having to engage a screw in the wall anchor.

It is also possible, of course, to act for this purpose on the wall anchor by acting on the transverse head of a screw. The screw rod is engaged with the internal thread of the screw nut shaft. The head bears against the collar of the head shaft in the longitudinal direction going from the head shaft towards the screw nut shaft. The screw is selected such that the screw rod has, between an end for connection to the screw head and a free end longitudinally opposed to the head, a longitudinal dimension such that its free end is accommodated between the teeth or set back longitudinally with respect to the latter but in engagement with the internal thread of the screw nut shaft when the head of the screw bears against the collar. At this time, the small bars of the wall anchor exhibit their initial configuration. This avoids any risk of accidental spreading of the teeth by the free end of the screw. Rotation of the assembly, constituted by the wall anchor and the screw about their then common axis with respect to the partition takes place in a circumferential direction corresponding to the direction of screwing of the screw in the wall anchor. If only one of the free sides of each tooth is in the shape of a cutting edge, it should in this case be that one of the free sides is turned in the same circumferential screwing direction.

Such an embodiment of the wall anchor enables drilling by rotation thereof about its axis with respect to the partition. The embodiment naturally remains compatible with setting in the partition like a nail, if the material of which the partition is made lends itself to this.

Preferably, each tooth is concave between its free sides. This facilitates the engagement of the cutting edges of the teeth on the constituent material and, in the case where the receiving hole for the wall anchor in the partition is drilled by relative rotation about the axis of the wall anchor, to facilitating the release of the material removed from the partition, each tooth is concave between its free sides.

Once the wall anchor is fully engaged in the partition, the transverse collar of its head shaft rests flat against the partition. Thus, plastic flexion of the bars, mutually connecting the head shaft and screw nut shaft forming the passage from the initial configuration to the anchoring configuration of the wall anchor, may take place conventionally by rotation of the screw. Accordingly, the wall anchor and the screw progressively bring the screw nut shaft closer, longitudinally, to the head shaft.

It is necessary that the point, formed by the teeth and initially covering the internal thread of the screw nut shaft, does not form an obstacle. This takes into account the fact that the progressive longitudinal displacement of the screw nut shaft in relation to the head shaft manifests itself by an ever greater longitudinal projection of the free end of the screw rod of the screw with respect to the screw nut shaft.

To this end, provision may be made for relatively large longitudinal sizing of the teeth. However, such a solution does not seem very satisfactory in so far as it is carried out to the detriment of the possible longitudinal travel of the screw nut shaft with respect to the head shaft. Thus, the flexing amplitude of the bars into the anchoring configuration, or an excessive overall longitudinal dimension of the teeth, necessitates a large clearance within or at the back of the partition to accommodate them.

An embodiment of the wall anchor according to the invention is consequently preferred in which the side for connection of each tooth to the screw nut shaft constitutes a privileged zone of flexing by plastic deformation. Thus, each tooth is capable of pivoting about the respective connection side, with respect to the screw nut shaft, in a direction away from the axis. This occurs under a thrust exerted by the screw rod of the screw, i.e. more precisely the free end of the screw rod, in the longitudinal direction goes from the head shaft towards the screw nut shaft.

Thus, even if the longitudinal dimensions of the teeth are limited to what is strictly necessary to define a sufficiently marked point to ensure the centring of the wall anchor during its penetration into the partition, the teeth do not constitute any obstacle to the further passage of the free end of the screw rod.

It will be observed that, insofar as a wall anchor according to the invention may be associated with a standard screw, devoid of a centring point, on the one hand, and in so far as the presence of the screw during the setting of the wall anchor according to the invention is not indispensable, the setting is carried out in the manner of a nail or by relative rotation about the axis of the wall anchor. In the rotation condition, the aforesaid indentation is provided for cooperation with a screwdriver around the free axial passage of the screw nut shaft. A wall anchor according to the invention may be marketed not only in the form of an assembly with a screw sized preferably as indicated previously, but also alone without a screw. The invention is suitable to be associated with a screw of any desired length between the free end of its screw rod and the end for connection of the screw rod to the screw head. This possibility facilitates considerably maintaining stock and avoids the public having to acquire, at the same time as the wall anchor, screws which will indeed be suitable for use with the latter but do not necessarily fulfil every need and must sometimes be replaced, by the user himself, by screws of a different length acquired in addition.

Other features and advantages of a wall anchor according to the invention, or of an assembly combining such a wall anchor and a screw, will become clear from the following description, relating to a non-limiting example, and also from the appended drawings which accompany the description.

BRIEF DESCRIPTION OF THE DRAWINGS

The present invention will become more fully understood from the detailed description and the accompanying drawings, wherein:

FIG. 1 is a side elevational view of a wall anchor according to the invention;

FIGS. 2 and 3 are end elevation views of the wall anchor, in the opposite directions marked respectively II and III in FIG. 1;

FIG. 4 is a side elevation view of the same wall anchor in an opposite direction from the viewing direction of FIG. 1;

FIGS. 6 to 8 are side plan views of three different methods of introducing a wall anchor according to the invention into a partition;

FIG. 9 is a side plan view of the wall anchor introduced into the partition by one of the means illustrated in FIGS. 6 to 8, the wall anchor still, however, being in its initial configuration;

FIG. 10 is a side plan view, like FIG. 9, starting the screwing of a screw with the wall anchor still exhibiting its initial configuration;

FIG. 11 is a side plan view of a final step of the screwing operation, with the wall anchor exhibiting its configuration for anchoring in the partition.

DETAILED DESCRIPTION OF THE PREFERRED EMBODIMENTS

Figure 5:
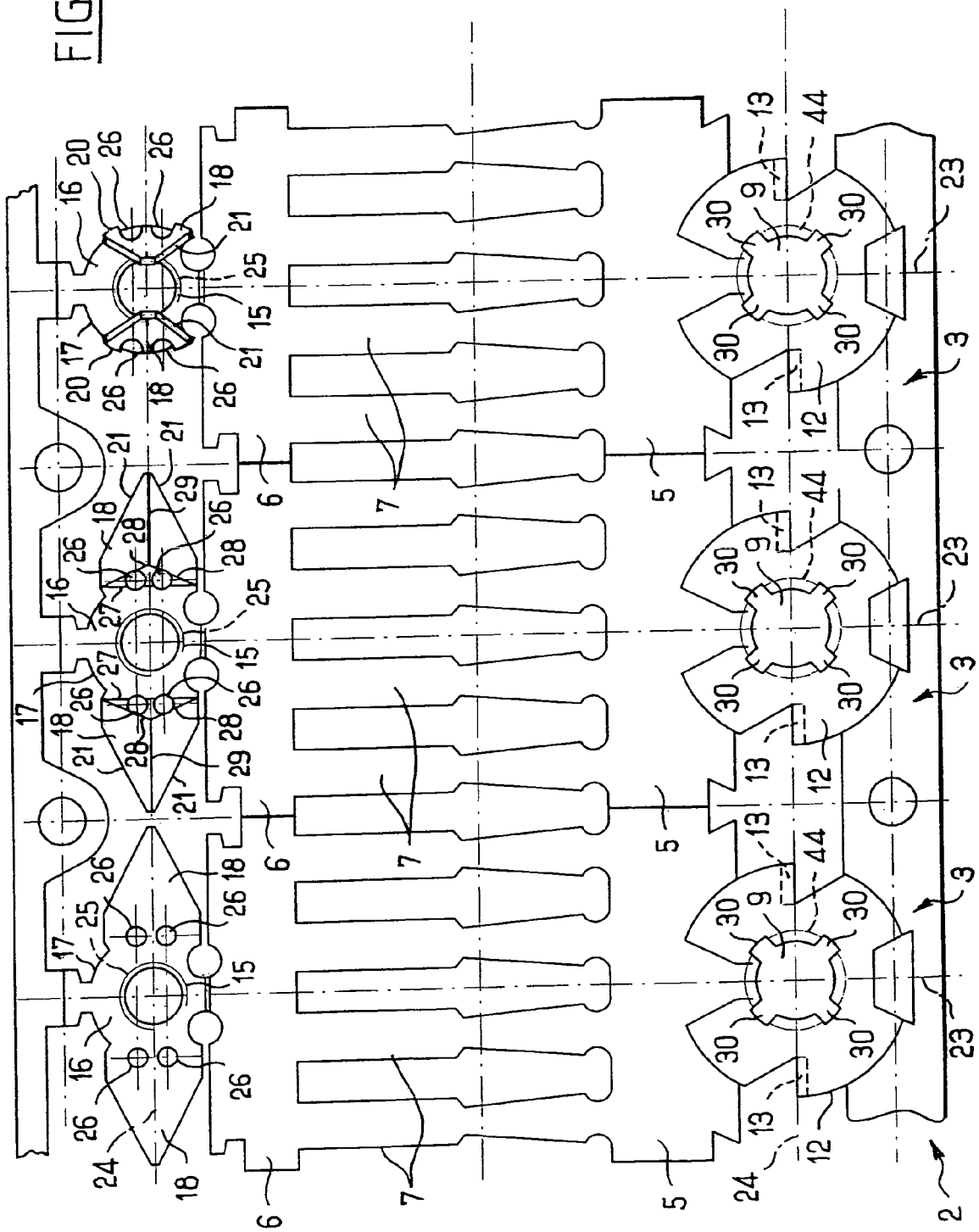
FIG. 5 is a plan view of a metal strip for producing a wall anchor according to the invention with three consecutive steps of the method being illustrated on a respective wall anchor blank.

The following description of the preferred embodiment(s) is merely exemplary in nature and is in no way intended to limit the invention, its application, or uses.

Reference will be made first to FIGS. 1 to 4, where a wall anchor 1 according to the invention is illustrated. The wall anchor 1 is advantageously produced in one piece by pressing, winding and folding a metal strip 2. A section of the metal strip is illustrated in FIG. 5. Three consecutive states characterize the production of a wall anchor according to the invention from such a strip 2 of a blank 3 for a wall anchor 1. For reasons of simplicity, the same numerical references will be used to designate the different parts of the wall anchor 1 according to the invention and the corresponding parts of the blank 3.

The wall anchor 1 defines a longitudinal axis 4 of general symmetry. A head shaft 5 and a screw nut shaft 6 are each in the form of a tubular sleeve of revolution about the axis 4. The head 5 and screw nut shafts 6 are mutually spaced longitudinally to define two end zones, mutually opposed longitudinally, of the wall anchor 1. A plurality of approximately longitudinal small bars 7, identical to one another, are regularly distributed angularly about the axis 4. The bars 7 are disposed between the head shaft 5 and screw nut shaft 6 and mutually connect them. The bars 7 are in one piece and are plastically flexible in a direction away from the axis 4 in order to pass from an initial configuration, in which the bars are illustrated in FIGS. 1 to 4 and 6 to 10, to a configuration for anchoring the wall anchor 1 in a partition 8, which anchoring configuration is illustrated in FIG. 11.

To facilitate this passage from the initial configuration to the anchoring configuration of the wall anchor 1, each bar 7 is slightly further from the axis 4 in a longitudinally median zone than at its connection, respectively, to either the head shaft 5 or the screw nut shaft 6. The bars 7 are four in number in the example illustrated in FIGS. 1 to 4. The number of bars 7, like their shape, is irrespective with regard to the present invention.

The head shaft 5 bounds internally a free coaxial passage 9 for a screw rod 10 of a screw 11 co-operating with the wall anchor 1. A flat transverse collar 12 defines one of the longitudinally end zones of the wall anchor 1. The collar 12, of generally annular shape, surrounds the coaxial passage 9 and forms a projection about the shaft 5 in a direction away from the axis 4. Two longitudinal teeth 13 are symmetrically positioned with respect to each other and with respect to the axis 4 and are produced by pressing of the collar 12. The teeth 13 anchor the collar in a face 14 of the partition 8 by the introduction and blind anchorage of the wall anchor according to the invention 1. The collar 12 is formed by a corresponding portion of the blank 3 of the wall anchor 1. This portion is initially cut out flat with the rest of the blank 3. The blank is folded back on a corresponding end of the head shaft 5 and turned longitudinally opposite to the bars 7. After winding of the portions of the blank 3 corresponding respectively to the head shaft 5 to the screw nut shaft 6 and to the bars 7 about an axis, which becomes the longitudinal axis 4 of the wall anchor 1.

The screw nut shaft 6 itself has a coaxial internal thread 15 capable of co-operating with the screw rod 10 of the screw 11. The coaxial internal thread 15 is provided in a flat annular cap 16 perpendicular to the axis 4 and produced in one piece with the screw nut shaft 6 and constituting a portion of the flat blank 3. The portion is turned down flat on an end of the screw nut shaft 6 located longitudinally opposite to the bars 7 after the aforesaid winding of the portions of the blank 3 corresponding to the head shaft 5, to the screw nut shaft 6 and to the bars 7 about the axis 4.

The collar 12 and the cap 16 remain firmly connected respectively to the head shaft 5 and to the screw nut shaft 6 on one side of the axis 4 by a respective tongue. The head shaft 5 and the screw nut shaft 6, on the other side of the axis 4, are connected by the engagement of a respect dovetail tongue or the like. The tongue is also produced in one piece with them, in a corresponding seat provided respectively in the head shaft 5 and in the screw nut shaft 6.

The cap 16 has an outer periphery 17 which is located in the direct longitudinal extension of the outer periphery of the screw nut shaft 6 at the end longitudinally opposed to the bars 7. Two teeth 18 are mutually symmetrical with respect to the axis 4. The teeth 18 form a longitudinal projection with respect to the cap 16 and to the screw nut shaft 6, longitudinally opposite to the bars 7, the head shaft 5 and the collar 12. The teeth 18 define the end of the wall anchor 1 longitudinally opposed to its end defined by the collar 12. The two teeth 18, which could be replaced by a different number of teeth 18, are preferably identical to one another and regularly distributed angularly about the axis 4. The teeth 18 are integral with the cap 16. The teeth 18 are produced from the one piece blank and come from the same flat blank 3 as the rest of the wall anchor according to the invention 1. The teeth 18 could also constitute pieces rigidly added onto the screw nut shaft 6, just as the rest of the wall anchor 1 could include of a plurality of components rigidly assembled with one another.

In a manner characteristic of the present invention, each of the teeth 18 converges towards the axis 4 in a longitudinal direction 19 going from the head shaft 5 towards the screw nut shaft 6 and correspond to the direction of introduction of the wall anchor according to the invention 1 into the partition 8 through the face 14 of the latter. Each of the teeth 18 has a generally triangular shape defined by an approximately rectilinear side 20. The side 20 is integrally connected with the outer periphery 17 of the cap 16, via the screw nut shaft 6 by way of the cap 16. Two free sides 21 are present which are substantially rectilinear and identical to one another and of opposed inclination with respect to the connection sides 20. The two teeth 18 bear mutually, on the axis 4, by mutual connecting corners of the respective free sides 21. The teeth 18 together define, for the wall anchor 1, a longitudinally end point 22 symmetrical with respect to the axis 4. The teeth 18 form a longitudinal projection on the screw nut shaft 6 in the direction 19.

A middle longitudinal plane 23 passes through the axis 4 and constitutes a middle plane of symmetry respectively for the tongue of material effecting the connection of the collar 12 in one piece with the head shaft 5. The dovetail tongue or the like effecting their mutual assembly is diametrically opposed with respect to the axis 4. The tongue effects the connection of the cap 16, in one piece, with the screw nut shaft 6. The dovetail tongue or the like, effecting their mutual assembly, is diametrically opposed with respect to the axis 4. The two teeth 18 are mutually symmetrical with respect to the plane 23. The two teeth 18 are respectively symmetrical with respect to another longitudinal middle plane 24 which cuts the middle longitudinal plane 23 perpendicularly along the axis 4 and along which the two teeth 13 are disposed.

In this preferred embodiment, the two free sides 21 of each tooth 18 are in the shape of a cutting edge. The teeth 18 are capable of attacking the material constituting the partition 8. Between these two free sides 21, each tooth 18 is concave or curved in towards the axis 4. This increases the aggressiveness of the cutting edges defined by the free sides 21 and facilitates the evacuation of the material removed from the partition 8 when the wall anchor according to the invention 1 is used to drill a hole by rotation on itself about its axis 4 with respect to the partition 8.

As the work progresses on the blanks 3, this presence and shaping of the teeth 18 is manifested in the following manner. In an initial state, illustrated on a blank 3 located on the left in FIG. 5, the blank is flat. The teeth 13 of the collar 12, a smooth annular flange 44 of the collar 12, intended to lodge coaxially inside the head shaft 5, a similar annular flange 25 of the cap 16, intended to lodge coaxially inside the screw nut shaft 6 and having the coaxial internal thread 15 intended to co-operate with the screw rod 10 of the screw 11 are already produced. The two teeth 18 are in the form of small triangular spurs disposed respectively on each side of the cap 16. The teeth 18 are pierced along their connection to the outer periphery 17 of the cap 16 by two respective circular holes 26 mutually juxtaposed along the periphery 17. The holes 26 are disposed symmetrically to one another with respect to a respective middle plane of symmetry of the two teeth 18 and further constituting the plane 24 of the wall anchor 1. In a following state of the blank 3, illustrated in the central portion of FIG. 5, a plurality of rectilinear fold lines are provided on each of the teeth 18. One respective line 27 constitutes approximately a tangent to the outer periphery 17 of the cap 16. The line 27 is intended to form the side 20 to connect the tooth 18 to the outer periphery 17. Two respective lines 28 form an isosceles triangle with a much smaller angle at the base than the angle at the vertex. The lines 28 join each other in the plane 24. The lines 27 and 28 are disposed with respect to the holes 26 such that the line 27 intersects each of the holes 26 corresponding to the same tooth 18. The line 27 remains close to a position tangent to the hole 26. Each of the lines 28 intersects a respective one of the holes 26. Each line 28 maintains a position close to a position tangent to the hole. A line 29, which is disposed in the plane 24, joins to the mutual connecting corner of the two free sides 21 of the corresponding tooth 18. The connection of the two lines 28 corresponding to the latter. As illustrated in the right-hand portion of FIG. 5, the two teeth 18 are folded along the respective line 27, over a little more than 90°, with respect to the collar 12. Along the respective lines 28 and 29, each of the teeth 18 forms the required concavity between its free sides 21. The mutual connecting corners of the latter are brought into a position close to the axis 4, without the axis 4 being reached.

It is only after the winding of the portions of the blank 3 corresponding to the head shaft 5, the screw nut shaft 6 and the bars 7, mutually connecting the shafts 5 and 6, and folding over of the collar 12 and of the cap 16, respectively on the head shaft 5 and on the screw nut shaft 6, in a respective orientation perpendicular to the axis 4, that an operation, not illustrated, of pinching the teeth 18 causes them to join each other. The teeth 18 are joined by the mutual connecting corners of the respective free sides 21, on the axis 4 to form the point 22.

In FIGS. 2 and 5, the collar 12, from the arrangement of the flange 44 intended to border the coaxial passage 9 around this coaxial passage 9, includes an indentation to receive a screwdriver. A cross-recess is present in the form of four notches 30 diametrically opposed in pairs, with respect to the axis 4. The cross recess is disposed in respective middle planes not illustrated, including the axis 4 and disposed at 45° with respect to the planes 23 and 24.

The wall anchor according to the invention 1 thus constituted, or constituted in an equivalent manner, may be used in different ways, which will now be described with reference to FIGS. 6 to 8 and then to FIGS. 9 to 11.

FIGS. 6 to 8 illustrate different possibilities for the use of a wall anchor 1 according to the invention. A hole 45 passes through the partition 8 from its face 14 to its opposite face 31 to receive the wall anchor 1 without play or practically without play. The anchor 1 passes through the partition 8 from side to side and is anchored by pinching of the partition 8 between the collar 12, bearing flat on the face 14, anchoring itself in the latter by means of the teeth 13, around the hole 45. If required, the anchor is embedded in the face 14 until flush with it. The bars 7 plastically deformed in a direction away from the axis 4 in order to bear on the face 31 of the partition.

FIG. 6 illustrates the use of the wall anchor 1 according to the invention like a nail, with respect to the partition 8.

With a view to such use, the axis 4 of the wall anchor 1 is oriented perpendicularly to the face 14 of the partition 8. The point 22 of the wall anchor 1 is placed against the face 14. The center of the mouth of the hole 45 is formed in the face 14 to coincide with the point 22.

Holding the wall anchor 1 in one hand, for example at the level of the bars 7, in this position with respect to the partition 8, the collar 12 is struck in the direction 19, substantially along the axis 4, by a hammer 32 held in the other hand in order to cause progressive penetration of the wall anchor 1. First, the point 22, the screw nut shaft 6, the bars 7 and the head shaft 5 enter into the partition 8 through the face 14 of the latter. This progressive penetration, by perforating the partition 8 from one side to the other, forms the hole 45. The hole 45 ends when the collar 12 comes to bear flat against the face 14 anchoring the anchor 1 via the teeth 13, or by embedding the anchor in the face 14 until flush with the latter, as shown in FIG. 9. According to the invention 1, when the collar 12 rests flat on the face 14 or is flush with the latter, the bars 7 are still in their initial configuration and emerge from the hole 45, beyond the face 31 of the partition 8. Over half of the bars longitudinal dimension remains engaged in the hole 45 over less than half of the longitudinal dimension.

This method of providing the hole 45, like those which will be described with reference to FIGS. 7 and 8, ensures that the hole 45 is coaxial with the wall anchor 1. Further, the transverse dimensions of the hole 45 are closely adapted to those of the wall anchor 1.

The mutual bearing, along the axis 4, of the mutual connecting corners of the free sides 21 of the two teeth 18, defining the point 22, ensures that the geometry of the latter is maintained throughout the formation of the hole 45. The convexity given to each tooth 18 contributes to stiffening the latter. In particular, the point 22 is kept identically in the position of the wall anchor 1 illustrated in FIG. 9. Accordingly, the wall anchor penetrates far enough into the hole 45 to support and anchor itself in the face 14 by the collar 12 and the teeth 13.

FIGS. 7 and 8 illustrate the provision of holes 45 by drilling the wall anchor 1 in the partition 8. The drill is effected by rotation of the wall anchor 1, about its axis 4, with respect to the partition 8.

In the method of use illustrated in FIG. 7, the wall anchor 1 is associated for this purpose with a screw 11. The screw rod 10 has the same axis 4 as the wall anchor 1. The screw rod 10 engages the internal thread 15 of the screw nut shaft 6 and has two ends longitudinally opposed to each other. One end 33 bears integrally a transverse head 34. The head 34 rest, in the direction 19, on the collar 12 around the passage 9 of the head shaft 5. A free end 35 is engaged in the coaxial internal thread 15 of the screw nut shaft 6. A longitudinal projection of sufficiently small size for the free end 35, in the direction 19, with respect to the screw nut shaft 6 and the collar 12, is placed between the teeth 18 without applying any thrust on them which could cause them to move away from one another. The longitudinal dimensioning of the rod 10 between its ends 33 and 35, depending on the longitudinal dimensions of the wall anchor, is within the normal capabilities of one in the field.

A screw is engaged coaxially in the head 34 of the screw 11 and rotated manually or electrically about the axis 4 in a circumferential direction 37. This coincides with the direction of screwing of the screw rod 10 of the screw 11 into the internal thread 15 of the screw nut shaft 6. Due to the head 34, bearing in the direction 19 against the collar 12, this rotation is manifested in an identical rotation of the assembly constituted by the screw 11 and the wall anchor 1 about the axis 4, with respect to the partition 8. The progressive drilling of the hole 45 in the partition is done via the cutting edges formed on the free sides 21 of the teeth 18. The hole 45 obtained is identical to that described with reference to FIG. 9, like the final relative position of the wall anchor 1 and of the partition 8. Once the collar 12 bears flat on the face 14 or is flush with the face 14 around the hole 45 and anchored in the face 14 by the teeth 13, the screw 11 can be unscrewed. Thus it is possible to obtain a result identical to what was described with reference to FIG. 9.

It will be observed that the methods of use of the wall anchor according to the invention 1 which were described with reference to FIGS. 6 and 7 do not utilize the notches 30 provided to receive a screwdriver around the coaxial passage 9 of the head shaft 5, in the collar 12. This renders the notches 30 optional.

The method illustrated in FIG. 8 involves the presence of the notches 30. Here, the wall anchor according to the invention 1 is used to drill the hole 45 by rotation about the axis 4 with respect to the partition 8. This is similar to FIG. 7. However, a screw 11 is not previously engaged in the wall anchor 1. The screwdriver 36 disposed coaxially with the wall anchor 1 engages the notches 30, to bring about the rotation of the wall anchor 1 about its axis 4 with respect to the partition 8. It will be observed that, in this case, the circumferential direction of rotation of the screwdriver 36 on itself about the axis 4, and of the rotation of the wall anchor 1 about its axis 4 by the screwdriver.36, may be the direction 37 corresponding to the screwing of a screw into the internal thread 15 of the screw nut shaft 6. Likewise, the opposite direction 38 of rotation insofar as the two sides 21 of each tooth 18 are in the shape of a cutting edge may perform the same role of attack in the material constituting the partition 8.

In this case, at the end of drilling of the hole 45 and of introduction of the wall anchor 1 into the latter, the wall anchor 1 is in the configuration and the position, with respect to the partition 8, described with reference to FIG. 9.

Thus, whatever the method used for producing the hole 45 in the partition 8 and reaching the position described with reference to FIG. 9, the wall anchor according to the invention 1 may then be used in the same manner. For example, as illustrated in FIGS. 10 and 11, the invention is used to anchor at least a locally flat object 39 to the partition 8. A locally flat zone 40 of the object 39 bears flat against the face 14 of the partition 8.

The object 39 has been illustrated in the form of an angle iron in FIGS. 10 and 11. The locally flat zone 40, in the form of a limb of this angle iron, but no limitation should be deduced therefrom regarding the type of object capable of being anchored to the partition 8 by a wall anchor according to the invention 1.

The flat zone 40 has two flat faces 42, 43, parallel and mutually opposed. A hole 41 is bored traverse between these faces 42 and 43. The hole 41 is disposed along an axis which is perpendicular to the faces and coincide with the axis 4 common to the wall anchor 1 and the hole 45. The through hole 41 has a diameter intermediate between the respective diameters of the screw rod 10 of the screw 11 and the head 34 of the latter. The flat portion 40 of the object 39 is placed with its face 42 flat against the face 14 of the partition 8 by way of the collar 12 or against the collar 12. The face 14 around the collar 12 causes the axis, with no reference number, of the hole 41 to coincide with the axis 4. As shown in FIG. 10, the free end 35 of the screw rod 10 engages coaxially in the hole 41, through the face 43 of the flat zone 40. As the screw 11 is moved in the direction 19, the screw rod 10 is passed through the flat zone 40, from one side to the other, through the hole 41. The head shaft 5 and the assembly remain coaxially, until the screw rod 10 comes into contact, via its free end 35, with the internal thread 15 of the screw nut shaft 6. The screw rod 10 is brought into screwing engagement by rotation in the appropriate direction 37 with respect to the wall anchor 1 by the action of a coaxial screwdriver 36 on the head 34 of the screw 11. The screw 11, which may be different from that described with reference to FIG. 7, has between the ends 35 and 33 of its screw rod 10 dimensions such that the head 34 bears flat on the face 43 of the flat zone of the object 39 around the hole 41. Also, the head may overhang by a certain longitudinal dimension with respect to the face 43 of the object 39.

The screwing of the screw rod 10 of the screw 11 into the internal thread 15 of the screw nut shaft 6 is continued by continuing the rotation of the screwdriver 36 in the direction 37 about the axis 4. The head 34 comes to bear flat on the face 43 around the hole 41. If such is not yet the case, the screw nut shaft 6 is brought longitudinally closer to the head shaft 5, against which the head 34 bears longitudinally in the direction 19 by way of the flat zone 40 of the object 39 and the collar 12. This brings about the deformation of the bars 7 in a direction away from the axis 4 and the bearing of a portion of the bars 7 flat on the face 31 of the partition 8 around the hole 45, as shown in FIG. 11.

As the screwing of the screw rod 10 of the screw 11 into the internal thread 15 of the screw nut shaft 6 proceeds, the free end 35 of the screw rod 10 forms a larger and larger longitudinal projection, in the direction 19, with respect to the screw nut shaft 6 and to the cap 16. Thus, the free end 35 comes into contact with the teeth 18, which it causes the gradual separation of, by plastic deformation at the respective side 20.

Thus, when the wall anchor 1 reaches its configuration for anchoring in the partition 8, illustrated in FIG. 11, the teeth 18 are moved away from the axis 4. The teeth 18 move away from one another perpendicularly to the axis 4 to which they may for example be approximately parallel, as is illustrated.

For reasons of transmission of force, easily understood by one in the field, the connection of the teeth 18, along their respective side 20, to the cap 16 may offer little resistance to this relative movement away under the thrust of the free end 35 of the screw rod 10 of the screw 11. When the teeth 18 occupy their relative position defining the point 22, the latter may have sufficient rigidity to maintain its geometry in the presence of the reaction which the partition 8 offers to the penetration of the wall anchor 1 in the direction 19.

Once the position, described with reference to FIG. 9, of the wall anchor according to the invention 1 with respect to the partition 8 has been reached, the continuance of setting of the wall anchor 1, that is to say in particular the deformation of its bars 7 in the direction of anchorage in the partition 8 illustrated in FIG. 11, may take place in a different manner from that which has just been described with reference to FIGS. 10 and 11. Thus, it is possible in particular to use for this purpose, in the absence of the screw 11, a tool well known per se, used for the setting and anchoring of the wall anchors described in FR-B 2 546 989, or to use the screw 11 for this purpose in the manner described with reference to FIGS. 10 and 11 but without inserting anything between its head 34 and the collar 12 of the wall anchor 1. The head 34 bears directly in the direction 19 during the rotation of the screw 11 in the direction 37 by the screwdriver 36 in order to bring the screw nut shaft 6 closer to the head shaft 5 and cause plastic flexing of the bars 7 in a direction away from the axis 4, in order to reach the anchoring configuration illustrated in FIG. 11. Then, in the latter case unscrewed the screw 11 which served for the deformation of the bars 7, the object 39 can be fixed to the partition 8, by means of the wall anchor according to the invention 1. For this purpose, a screw 11 which may be identical to that which may have been used for the deformation of the wall anchor 1, or may be different therefrom.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A wall anchor for a screw of the type having a longitudinal axis comprising:

two shafts having a respective generally tubular form of revolution about the axis and mutually opposed longitudinally;

said two shafts comprising a head shaft having an internally free coaxial passage for a screw rod of the screw and bearing externally a transverse longitudinally end collar;

a screw nut shaft having on the inside a coaxial internal screw thread capable of co-operating with said screw rod and bearing at its outer periphery a plurality of approximately longitudinal teeth distributed angularly about the axis, and forming a longitudinal projection with respect to the screw nut shaft longitudinally opposite to the head shaft with respect to the screw nut shaft;

a plurality of approximately longitudinal bars distributed angularly about the axis disposed between the head shaft and screw nut shaft, said bars being plastically flexible in a direction away from the axis, in order to pass from an initial configuration to an anchoring configuration of the wall anchor; and each tooth converges towards the axis in a longitudinal direction going from the head shaft towards the screw nut shaft, and which tooth has a generally triangular shape defined by a side for connection to the screw nut shaft and by two free sides, said free sides forming cutting edges and come together to form a point such, that the teeth together define a point symmetrical with respect to the axis, projecting longitudinally on the screw nut shaft in said longitudinal direction.

2. A wall anchor according to claim 1, wherein said side for connection of each tooth to the screw nut shaft constitutes a privileged zone of flexing by plastic deformation, and each tooth is capable of pivoting about said respective connection side, with respect to the screw nut shaft, in a direction away from the axis, in particular under a thrust exerted by the screw rod of the screw in said longitudinal direction.

3. A wall anchor according to claim 1, wherein at least one of said free sides of each tooth, turned in a specific circumferential direction, is in the form of a cutting edge.

4. A wall anchor according to claim 3, wherein said free sides of each tooth are in the respective shape of a cutting edge.

5. A wall anchor according to claim 3, wherein the head shaft has an indentation for cooperating with a screwdriver around said free coaxial passage.

6. A wall anchor according to claim 1, wherein each tooth is concave between said free sides.

7. A wall anchor according to claim 1, wherein each tooth is produced in one piece with the screw nut shaft.

8. A wall anchor according to claim 7, wherein said anchor is formed at least essentially from a single stamped metal strip.

9. An assembly constituted by a wall anchor according to claim 1, and a screw, including a transverse head capable of bearing against the collar of the head shaft in said longitudinal direction and a longitudinal screw rod having an end for rigid connection to said head and a free end longitudinally opposed to said head and capable of freely traversing, coaxially, the passage of the head shaft and of co-operating with the internal thread of the screw nut shaft;

wherein the screw rod has between said ends a longitudinal dimension such that its free end is accommodated between the teeth of the screw nut shaft, or set back longitudinally with respect to the latter but in engagement with the internal thread of the screw nut shaft, when the head of the screw bears against the collar of the head shaft in said initial configuration.

* * * * *

UNITED STATES PATENT AND TRADEMARK OFFICE
CERTIFICATE OF CORRECTION

PATENT NO. : 6,969,220 B2
DATED : November 29, 2005
INVENTOR(S) : Robert Anquetin It is certified that error appears in the above-identified patent and that said Letters Patent is hereby corrected as shown below:

Column 12,
Lines 8-9, "point such, that the teeth" should be -- point, such that each tooth forming the generally triangular shape is in a different plane and comes --.
Line 9, after "together" insert -- to --.

Signed and Sealed this

Twenty-third Day of May, 2006

JON W. DUDAS
*Director of the United States Patent and Trademark Office*